United States Patent [19]

Dautzenberg et al.

[11] 3,707,831
[45] Jan. 2, 1973

[54] CORRUGATED GAUZE REACTOR

[75] Inventors: Frits M. Dautzenberg; Jaap E. Naber; Cornelis W. J. Verwey, all of Amsterdam, Netherlands

[73] Assignee: Shell Oil Company, New York, N.Y.

[22] Filed: May 28, 1970

[21] Appl. No.: 41,460

[30] Foreign Application Priority Data

June 23, 1969  Netherlands ..................... 6909550

[52] U.S. Cl. ..................... 55/483, 23/288 F, 55/512, 55/521
[51] Int. Cl. ........................... B01d 29/08, B01j 9/04
[58] Field of Search ....... 23/288 F, 289; 55/489, 484, 55/497, 483, 512, 52

[56] References Cited

UNITED STATES PATENTS

| | | | |
|---|---|---|---|
| 2,980,208 | 4/1961 | Neumann | 55/500 |
| 2,288,943 | 7/1942 | Eastman | 23/288.3 F |
| 2,865,721 | 12/1958 | Lane et al. | 23/288.3 F |
| 3,358,427 | 12/1967 | Bub | 55/489 |
| 3,458,977 | 8/1969 | Young et al. | 55/521 |
| 3,477,833 | 11/1969 | McMullen et al. | 23/288 |
| 3,436,192 | 4/1969 | Karlsson | 23/288 |
| 3,501,897 | 3/1970 | Van Helden et al. | 55/73 |

FOREIGN PATENTS OR APPLICATIONS 812,635  2/1937  France ......................... 55/484

Primary Examiner—Bernard Nozick
Attorney—Harold L. Denkler and J. H. McCarthy

[57] ABSTRACT

Apparatus for contacting a gas with a solid material comprising an assembly of tubular containers for the solid material which are mounted in a housing provided with a gas inlet and a gas outlet. The containers have gas-permeable walls and are positioned so that gas channels are formed along the containers by the walls of adjacent containers and/or the walls of adjacent containers and the walls of the housing. To construct the apparatus, a number of corrugated parallel gauze plates may be tack-welded together such that each plate forms a mirror image of an adjacent plate. When in use some of the channels thus formed contain solid material, and others are used as gas channels.

3 Claims, 3 Drawing Figures

PATENTED JAN 2 1973 3,707,831

INVENTORS:
F. M. DAUTZENBERG
J. E. NABER
C. W. J. VERWEY

CORRUGATED GAUZE REACTOR

BACKGROUND OF THE INVENTION

1. Field of the Invention

The invention relates to an apparatus for removing pollutants from industrial waste gases.

More particularly, the invention relates to an apparatus for contacting a gas mixture with a solid substance to remove one or more gaseous components from the gas mixture.

2. Description of the Prior Art

It is well known that components of some industrial waste gases may, if discharged freely into the atmosphere, give rise to atmospheric pollution. Examples of such components which are generally considered harmful contaminants are sulphur dioxide, sulphur trioxide, oxides of nitrogen and residues of combustible substances in exhaust gases of combustion engines. One or more of these components occur, for instance, in flue gases and in waste gases of sulphuric acid plants, nitric acid plants and roasting furnaces for ores.

At least some of these components may be removed from a waste gas mixture by contacting the mixture with a solid substance which may be an acceptor or a catalyst. (In the present application the term acceptance is meant to denote the physical or chemical binding of a gas by a solid substance, and the term acceptor a solid substance which is capable of binding a gas. The gas may be gaseous compound or a gaseous element.)

For example, sulphur oxides may be removed from flue gases by contacting flue gases containing one or more sulphur oxides as well as oxygen with an acceptor which contains a metal supported on a carrier material. Processes of this type may be conducted at flue gas temperature, i.e. at about 200 – 500°C. During contact the sulphur dioxide and/or trioxide is accepted by the metal. The purified gases do not give rise to atmospheric pollution and may, moreover, be discharged via a stack without being heated.

The metal compound formed during acceptance may subsequently be decomposed with the aid of a reducing gas. By this "regeneration" acceptor material which is capable of accepting new amounts of sulphur oxides is formed again. Moreover, a gas is formed which is considerably richer in sulphur dioxide than the non-purified flue gas. This sulphur dioxide rich gas may be used, for instance, for the production of sulphuric acid or elemental sulphur.

An attractive apparatus for the removal of sulphur oxides from flue gases is described in U.S. Pat. No. 3,501,897 to Van Helden et al. This apparatus comprises one or more open gas channels running parallel or substantially parallel to each other and having walls designed and built such that acceptor material presented on, in and/or behind said channel walls is, for the purpose of accepting harmful contaminants, freely accessible to a gas mixture passed through said open gas channels. An advantage of this type apparatus is that it is not clogged by solid particles such as soot and fly ash which may be present in flue gases. Thus, the apparatus may remain in operation for long periods. This favorable result is not obtained if the flue gases are passed through a fixed bed of acceptor particles because a fixed bed is more rapidly clogged and therefore made inoperative by ash and soot particles.

SUMMARY OF THE INVENTION

The present invention provides an improved apparatus of the type described in the above-mentioned patent application. The improved apparatus comprises a system of tubular containers for the solid substance, which system is present inside a housing which is provided with a gas inlet and a gas outlet. The tubular containers have at least partially gas-permeable walls and are so mounted in the housing that along the tubular containers gas channels are bound by the walls of the containers and/or by one or more walls of the containers and one or more walls of the housing.

DESCRIPTION OF A PREFERRED EMBODIMENT

Figure 2:
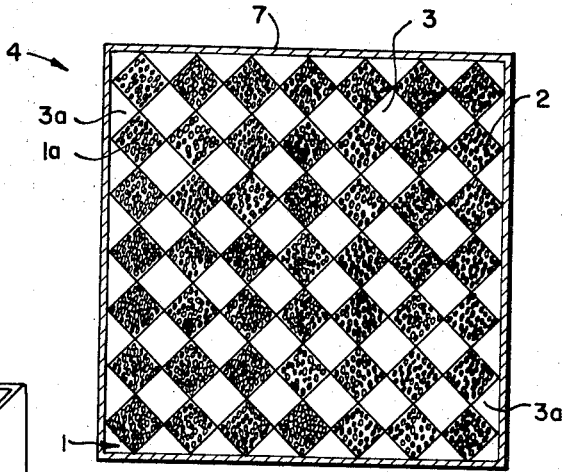
FIG. 2 is a cross-sectional view along the line 2—2 of the apparatus of FIG. 1.
Figure 1:
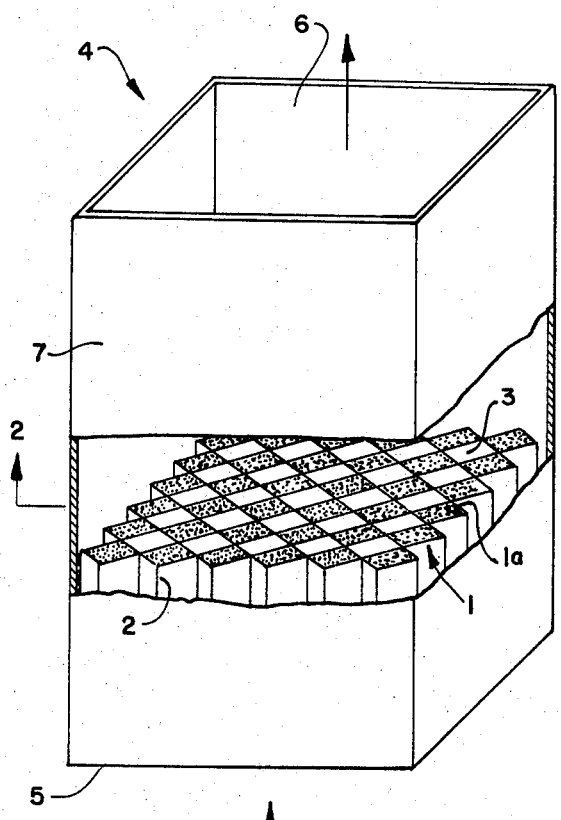
FIG. 1 is a cutaway view seen at an oblique angle of an apparatus in accordance with the teachings of this invention.

Referring now to FIGS. 1 and 2, we see 12 parallel tubular containers 1 filled with solid particles 13. The containers 1 have gas-permeable walls 2 which may be made of gauze. In the case depicted each container 1 has four gas-permeable walls 2. The walls 2 form at least a portion of the boundaries of a number of gas channels 3 and 3a through which a gas mixture may flow. Components of this gas mixture may flow through the walls 2 and subsequently come in contact with the particles 1a present in the containers.

In the embodiment shown, each tubular container 1 is directly attached to surrounding containers 1, and containers 1 are so positioned that one container 1 alternates with one gas channel 3. The system of containers and gas channels is mounted in a housing 4 provided with a gas inlet 5 and a gas outlet 6. The housing 4 has walls 7, which, in the apparatus shown, form a portion of the boundaries of eight gas channels 3a. The six tubular containers 1 adjacent the walls 7 may be attached to the walls 7. In the present case the containers 1 are open at their top ends. At their bottom ends the containers are closed by means of a bottom plate (not shown).

Figure 3:
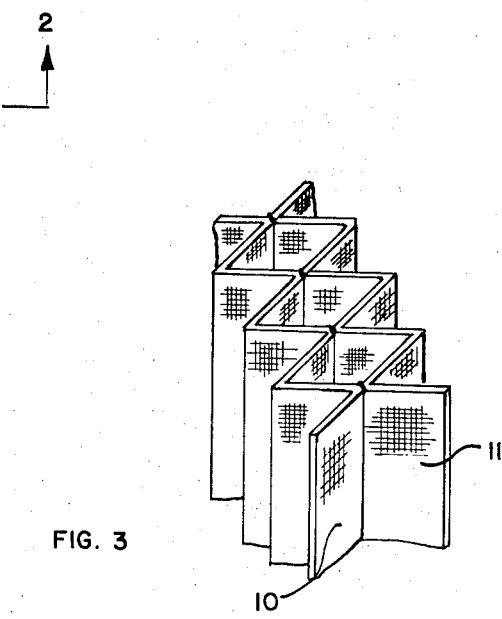
FIG. 3 is an oblique view of two sheets of corrugated material of a type which may be used in constructing an apparatus in accordance with this invention.

The apparatus shown may be manufactured in a very simple manner by welding a zigzag sheet of gauze — such as sheet 10 (FIG. 3), to another zigzag sheet of gauze such as sheet 11.

The containers 1 are tubular, which is to say that the length of a container 1 is relatively large, for instance more than 5 times and usually more than 10 times the largest dimension of a section perpendicular to the longitudinal axis of said container 1. Any bulging of the walls of the containers 1 due to the presence of solid material in the containers 1 can therefore only have relatively small dimensions. As a consequence, said bulging does not lead to the gas channels 3 and 3a being shut off, so that the gas channels 3 and 3a continue to allow the passage of gas and all the solid material 1a present can satisfactorily come into contact with the gas mixture.

The gas channels 3 and 3a are open at both ends. Of course, the acceptor containers 1 are closed at both ends or at one end, to prevent loss of solid particles. The fact that the walls 2 of the tubular containers 1 are at least partially permeable to gas implies that they possess apertures and/or pores sufficiently large to enable the molecules of the gas mixture to pass through the wall by diffusion, thus coming into contact with solid substance 1a behind the walls 2.

The tubular containers 1 may be positioned parallel to each other, but they may also be mounted such that they make angles with each other. In order that the resistance to the flow of a gas mixture through the gas channel 3 and 3a may be as low as possible, the tubular containers are preferably mounted parallel to each other and each of the gas channels 3 and 3a connects with the opposing gas inlet 5 and gas outlet 6 of the housing.

As mentioned above, the tubular containers 1 are so mounted in the housing that the containers 1 form at least a portion of the boundaries of gas channels 3 and 3a. To this end the containers may be mounted in any suitable manner. In general the containers 1 are inter-connected in order to form the boundaries of gas channels. The containers 1 may be inter-connected while they are spaced some distance apart, the boundaries of the gas channels being formed by the containers 1 and by spacers, or the containers may be directly inter-connected, in which case the boundaries of the gas channels 3 and 3a are formed by the containers only. Of course, in both cases the walls 7 of the housing, too, may contribute to a portion of the boundaries of some of the gas channels 3a. The tubular containers 1 are preferably inter-connected directly, because in this case the gas mixture can at all points pass along gas-permeable walls 2 of the containers and is not hampered by a spacer, behind which, of course, there is no solid substance. Moreover, a system of directly inter-connected tubular containers 1 forms a sturdy structure which takes up relatively little space.

In order to make the interior of a tubular container 1 readily accessible to a gas mixture flowing through the gas channels 3, the tubular containers are preferably so positioned that one container 1 alternates with one gas channel 3. The containers may also be so positioned that two containers 1 alternate with one gas channel, but of course in such an arrangement the solid substance 1a is less readily accessible to the gas mixture.

An attractive embodiment of the apparatus according to the invention is one in which the tubular containers 1 and the gas channels 3 and 3a are formed by a number of corrugated or zigzag, parallel, gas-permeable sheets such as sheets 10 and 11 (FIG. 3) which are so mounted that two neighboring sheets are arranged mirror-symmetrically.

An apparatus according to this embodiment may be constructed in a relatively short time and with the aid of relatively little material.. The corrugated or zigzag sheets are first manufactured and then combined into a system. The sheets can be inter-connected very easily, for instance by spot-welding, stapling or soldering. The fact that the sheets are arranged mirror-symmetrically implies that the ridges and hollows of one sheet are arranged opposite, respectively, the hollows and ridges of a neighboring corrugated or zigzag sheet. In this way the gas channels are bound by facing undulations or zigzag surfaces, which undulations or zigzag surfaces also form part of the tubular containers.

The section of a tubular container perpendicular to the longitudinal axis of said container may have any desired shape, for instance triangular, quadrilateral, polygonal, circular or oval. A quadrilateral section may be an irregular guadrangle, a rectangle or a square. In general, the corners of the sections will be slightly rounded, or as may be the case with the above-mentioned corrugated sheets, slightly bent in outward direction.

The length of the gas channels usually is a multiple of the largest distance between the channel walls. Said length is mainly determined in accordance with the composition, at the gas inlet, of the gas mixture to be used, the desired composition of the gases at the gas outlet, the linear velocity of the gas mixture in the gas channels, the cross-section of the gas channels and the activity of the catalyst or the acceptor. All these variables may be, for a particular gas mixture to be used, individually adapted to each other.

The gas-permeable walls of the tubular containers may consist of any suitable material. The walls may be made, for instance, of gauze or of perforated sheets, and consist, for instance, of metal. In view of its permeability, gauze has been found very suitable. The mesh width of the gauze is adapted to the particle size of the solid substance which will be introduced into the tubular containers. Part of the solid material may disintegrate into smaller particles after a long period of use. These smaller particles, however, are easily retained by the larger particles, even if the meshes of the gauze are somewhat larger than the particles formed by disintegration. Consequently, loss of particles in negligible. For this reason a gauze may be used with meshes which are somewhere within the range of the sizes of the particles of the solid material. The mesh width of the gauze may be, for instance, between 1 and 10 mm.

The shape of the particles of the solid material to be introduced into or present in the tubular containers may be chosen in accordance with every individual application. These particles may be shaped, for instance, as cylinders, spheres, blocks, cubes or plates. The solid material may also be shaped as stalks or long sheets, which stand upright in the tubular containers.

The apparatus has been found very suitable for removing sulphur oxides from flue gases. An attractive process for the purification of flue gases consists in that gases containing sulphur oxides and oxygen are brought into contact with a solid acceptor consisting of one or more metals and/or metal compounds on a solid carrier material. A suitable carrier material is gamma-alumina. If the metal is copper or the metal compound is copper oxide, processes of this type may be carried out at flue gas temperatures. i.e. at about 200 – 500°C. During the passage of the flue gases through the gas channels the sulphur oxides are accepted by the metal or metal compound present on or in the acceptor particles. The purified gases are practically free from sulphur oxides and may, moreover, be discharged through a stack, without first being heated. The acceptor loaded by the acceptance of sulphur oxides may subsequently be regenerated with the aid of a reducing gas, also at flue gas temperature, as a result of which a gas is obtained which is considerably richer in sulphur dioxide than the flue gas to be purified. This sulphur dioxide rich gas may be used, for instance, as starting material for the preparation of sulphuric acid or elemental sulphur.

We claim as our invention:
1. An apparatus for contacting a gas mixture with solid particles comprising:
   A. a housing provided with a gas inlet and a gas outlet;
   B. a plurality of tubular containers containing said solid particles and positioned within said housing;
   C. a plurality of open tubular channels within said housing positioned to conduct gas from said gas inlet to said gas outlet;
   D. said tubular containers and gas channels being formed by corrugated, parallel, gas-permeable sheets connected to each other with adjacent sheets arranged mirror-symmetrically;
   E. said tubular containers and open tubular channels filling the entire cross-section of said housing between said gas inlet and said gas outlet; and
   F. said tubular containers being so positioned that one container alternates with one gas channel.

2. The apparatus of claim 1 wherein the sheets are interconnected by welding.

3. The apparatus of claim 1 wherein the walls of the tubular containers are made of gauze.

* * * * *